United States Patent
Childs (10) Patent No.: US 10,381,927 B2
(45) Date of Patent: Aug. 13, 2019

(54) PULSE-FREQUENCY MODULATION CONSTANT ON-TIME WITH PEAK-CURRENT SERVO

(71) Applicant: Dialog Semiconductor (UK) Limited, London (GB)

(72) Inventor: Mark Childs, Swindon (GB)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/651,785

(22) Filed: Jul. 17, 2017

(65) Prior Publication Data

US 2019/0020275 A1   Jan. 17, 2019

(51) Int. Cl.
*H02M 3/158* (2006.01)
*H02M 1/08* (2006.01)
*H02M 1/00* (2006.01)

(52) U.S. Cl.
CPC ............ *H02M 3/158* (2013.01); *H02M 1/08* (2013.01); *H02M 3/1582* (2013.01); *H02M 3/1588* (2013.01); *H02M 2001/0009* (2013.01)

(58) Field of Classification Search
CPC ....... H02M 3/1582; H02M 2001/0009; H02M 3/158; H02M 3/1588; H02M 3/156; H02M 1/08
See application file for complete search history.

(56) References Cited

U.S. PATENT DOCUMENTS

| | | | |
|---|---|---|---|
| 5,528,132 A | 6/1996 | Doluca | |
| 5,747,976 A | 5/1998 | Wong et al. | |
| 2004/0095264 A1* | 5/2004 | Thomas | H02M 3/157 341/53 |
| 2008/0024104 A1 | 1/2008 | Yamada | |
| 2012/0019224 A1 | 1/2012 | Lima et al. | |
| 2014/0253083 A1 | 9/2014 | Shao | |
| 2015/0061617 A1 | 3/2015 | Archibald | |
| 2015/0349636 A1* | 12/2015 | Bodano | H02M 3/158 323/271 |
| 2017/0149334 A1* | 5/2017 | Bodano | H02M 3/157 |

OTHER PUBLICATIONS

German Office Action, File Ref: 10 2017 219 664.5, Applicant: Dialog Semiconductor (UK) Limited, 5 pgs, and English language translation, 5 pgs.

* cited by examiner

*Primary Examiner* — Kyle J Moody
(74) *Attorney, Agent, or Firm* — Saile Ackerman LLC; Stephen B. Ackerman (57) ABSTRACT

The disclosure describes a DC-DC switching converter providing a peak-current servo, employing a pulse-frequency modulation (PFM) control signal and a constant on-time. A Buck, Boost, Buck-Boost, or similar switching converter that supports PFM mode is required, using a fixed on-time scheme for PFM. A final value of the coil current is sampled, and the sampled value of the coil current is compared to a target value for the coil current, to establish whether it is greater or less than the target value. The on-time of the high side device is adjusted to bring the final value of the coil current closer to the target value, using an adaptive coil current measurement.

26 Claims, 9 Drawing Sheets

PULSE-FREQUENCY MODULATION CONSTANT ON-TIME WITH PEAK-CURRENT SERVO

RELATED PATENT APPLICATIONS

This application is related to German patent application 102016217857.1 filed on Sep. 19, 2016, which is owned by a common assignee and is herein incorporated by reference in its entirety.

BACKGROUND

Field

The disclosure relates generally to a DC-DC switching power converter, employing a pulse-frequency modulation (PFM) control signal and a constant on-time.

Description of Related Art

In a single phase Buck switching converter, a simple form of pulse-frequency-modulation (PFM) in discontinuous mode (DCM) is used. This means that for a light load, a Buck (Boost, Buck-Boost, or similar switching converter) operates by producing a single pulse of current.

Figure 1:
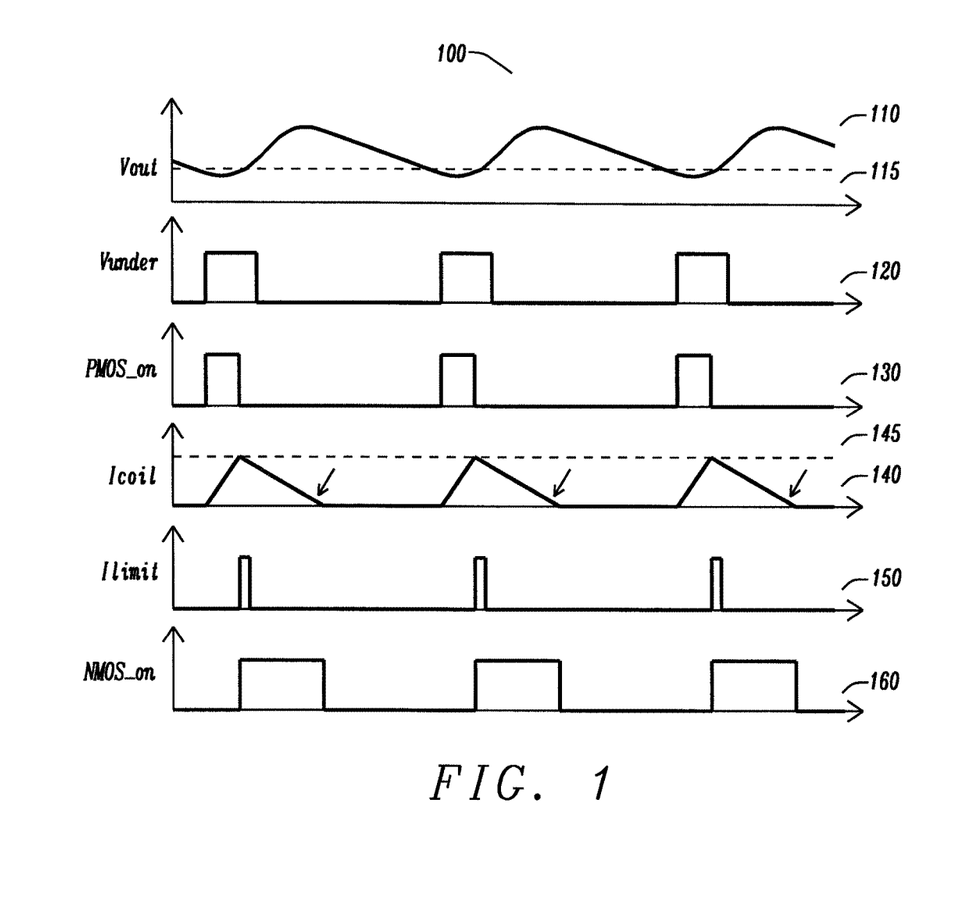
FIG. 1 illustrates signal waveforms for a single-phase DC-DC switching converter, using a simple form of pulse-frequency-modulation (PFM) in discontinuous mode (DCM), of the prior art.

FIG. 1 illustrates signal waveforms 100 for a single-phase DC-DC switching converter, using a simple form of pulse-frequency-modulation (PFM) in discontinuous mode (DCM), of the prior art. In this mode, the Buck switching converter turns on high side pass-device PMOS_ON 130, when output voltage VOUT 110 falls below target voltage 115, setting VUNDER 120. When the high side pass-device turns on, coil current ICOIL 140 starts to rise. Once the coil current hits target current 145, setting ILIMIT 150, the high side pass-device turns off and low pass-device NMOS_ON 160 turns on. The coil current then falls, and once it reaches zero, the low side pass-device is turned off. The pass-devices are then both off, and the voltage is stored on the output capacitor. The output voltage then discharges slowly, until the output voltage falls below the target voltage and the cycle is started again.

SUMMARY

An object of the disclosure is to provide a peak current servo, employing a pulse-frequency modulation (PFM) control signal and a constant on-time. A DC-DC switching converter (Buck, Boost, Buck-Boost, or similar switching converter) supporting PFM mode is required, using a fixed on-time scheme. The final value of the coil current is sampled, and the sampled value of the coil current is compared to a target value for the coil current, establishing whether it is greater or less than the target value. The on-time of the high side device is adjusted to bring the final value of the coil current closer to the target value.

Still further, another object of this disclosure is the design of a switching converter with a small value inductor, achieving an accurate peak current in PFM.

Further, another object of this disclosure is the design of a well controlled peak coil current in PFM, regardless of the coil value or operating conditions.

To accomplish the above and other objects, a DC-DC switching converter is disclosed, comprised of a peak-current servo, configured to employ a pulse-frequency modulation (PFM) control signal and a constant on-time. The switching converter is further comprised of a sampling circuit, configured to allow the peak current information to be observed after the high side device has turned off, and to allow the pulse duration information to be observed after the low side device has turned off. The switching converter is further comprised of a comparator, configured to compare the sampled peak current information with a target current value, and to compare said sampled pulse duration information with the clock period. The switching converter is further comprised of a counter, configured to adjust the on-time such that the peak current of subsequent cycles converges on the target current, and to adjust the on-time such that the pulse duration of subsequent cycles converges on the clock period. The switching converter is further comprised of sampled pulse duration information, configured to adjust the controlled high side device on-time for fixed on-time PFM mode.

The above and other objects are further achieved by a method for a DC-DC switching converter with a peak-current servo, supporting pulse-frequency modulation (PFM) mode and a constant on-time. The steps include operating a switching converter using a fixed on-time scheme for PFM mode, wherein the switching converter comprises high and low side devices, to drive an inductor. Sampling a current through an inductor to generate a first current is provided. Sampling a second current is provided. Comparing the first and second currents is provided. Changing a counter value, based on comparing the first and second currents, is provided. Adjusting the on-time of the high side device, based on the counter value, is provided.

In various embodiments, the function may be achieved by implementing a pulse duration closer to the clock period, where the pulse duration will converge with the clock period over subsequent cycles.

In various embodiments, the function may be achieved by implementing a PMOS high side device and an NMOS low side device.

In various embodiments, the function may be achieved by implementing a pair of reference currents and a pair of capacitors.

DETAILED DESCRIPTION

In order to achieve higher performance, and better load transient response, it is beneficial to use small value inductors in single-phase DC-DC switching converters. For efficiency reasons, it is often required that the peak current in pulse-frequency-modulation (PFM) is well controlled. In addition, there are electromagnetic interference (EMI) reasons to limit the peak current in PFM mode.

In Buck switching converters, with very small value inductors, the current can ramp up faster than the current limit can control. This can be due to the delay of the current limit comparator, such that the coil current will rise a significant amount in the time taken for the comparator to trigger. Also the comparator may be disabled between current pulses, or placed in a low bias state, and the time taken for it to enable may be longer than the rise time of the coil current.

For this reason, it can be beneficial to move a Buck (Boost, Buck-Boost, or similar switching converter) to a fixed on-time architecture in PFM mode. In a fixed on-time scheme, the high side device is turned on for a fixed time, each time the output drops below the target voltage. Once the high side device has been held on for this time, it is turned off and the low side device is turned on. The low side device is turned off once the current in the coil falls to zero. This scheme does not rely on measuring the high side device current, and can support much smaller value inductor coils, and much shorter high side device on-times. If the switching converter is required to specify an accurate peak current in PFM, for coils smaller than 240 nH, it can benefit from the adaptive peak current method disclosed herein.

However, for efficiency reasons, this scheme can cause problems. As the height of the PFM pulse is now uncontrolled, the exact height will change with input and output voltage conditions. This can also be an issue in a system for EMI reasons. The existing solution to this is to use a lookup table to estimate the on-time, based on either or both the supply voltage and the output voltage values.

The disclosure describes a peak current servo, employing a pulse-frequency modulation (PFM) control signal, while controlling the height of the PFM pulses with a fixed on-time PFM scheme. The coil current is sampled at the point where the high side device is turned off. This is then compared with a reference current, to establish whether the final coil current was greater, or less than, the target current. The timer is adjusted slowly, over many cycles, to bring the final coil current closer to the target current.

Figure 2:
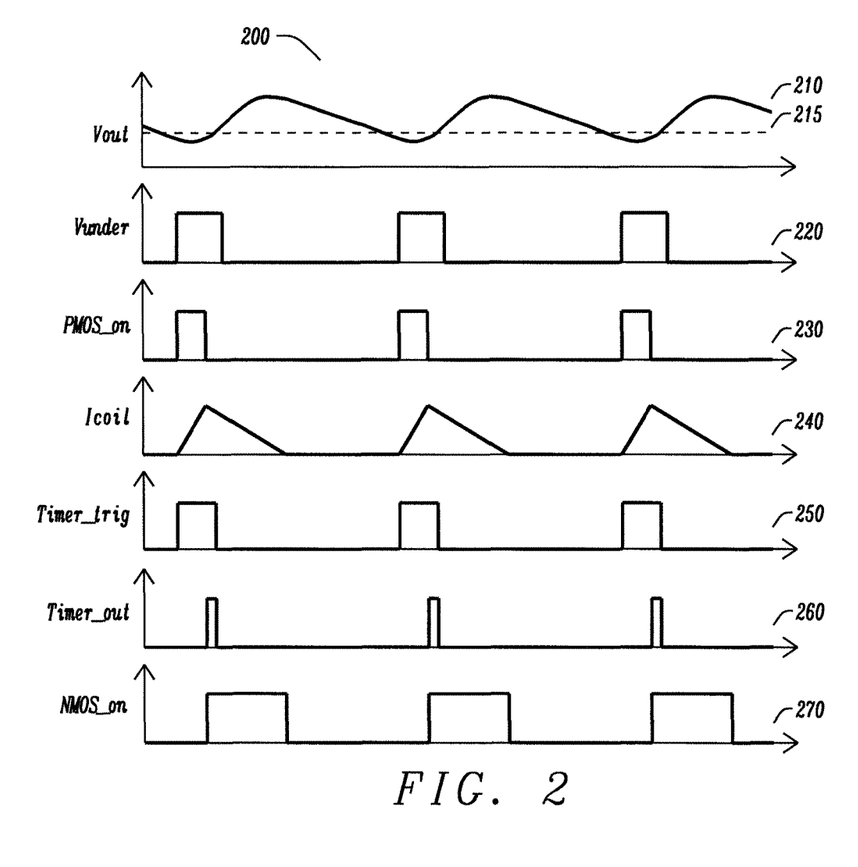
FIG. 2 illustrates signal waveforms for a single-phase DC-DC switching converter, using pulse-frequency modulation (PFM) and a constant on-time control scheme for the high side device, embodying the principles of the disclosure.

FIG. 2 illustrates signal waveforms 200 for a single-phase DC-DC switching converter, using pulse-frequency modulation (PFM) and a constant on-time control scheme for the high side device, embodying the principles of the disclosure. When output voltage VOUT 210 drops below target voltage 215, the under-voltage comparator flags under-voltage VUNDER 220. This causes high side device PMOS_ON 230 to turn on, and coil current ICOIL 240 to ramp up. At the same time, an enable TIMER_TRIG 250 is raised on the timer cell, causing the timer to start. At some fixed time later, the timer will raise flag TIMER_OUT 260, which will indicate the fixed on-time has elapsed. This causes the high side device to turn off and low side device NMOS_ON 270 to turn on. The timer out causes the timer trigger to clear, and the timer trigger clearing causes the timer output to also clear. Once the coil current has ramped down to zero, the low side device is turned off and the output is set to tri-state. The output voltage then discharges with the load, until the output goes under-voltage and the cycle is started again.

As disclosed in related German patent application 102016217857.1, a peak current servo is implemented, and the voltage on the LX node is sampled to a capacitor during the high side device on-time. At the end of the on-time, as the high side device is turned off, the final value of the LX voltage is stored on the sampling capacitor. This voltage, with respect to the supply voltage, represents the final current in the coil, during the high side device on-time. This can be compared to a target current value, after the high side device has been turned off, to establish if the peak current in the coil was greater than, or less than, the target current.

Figure 3:
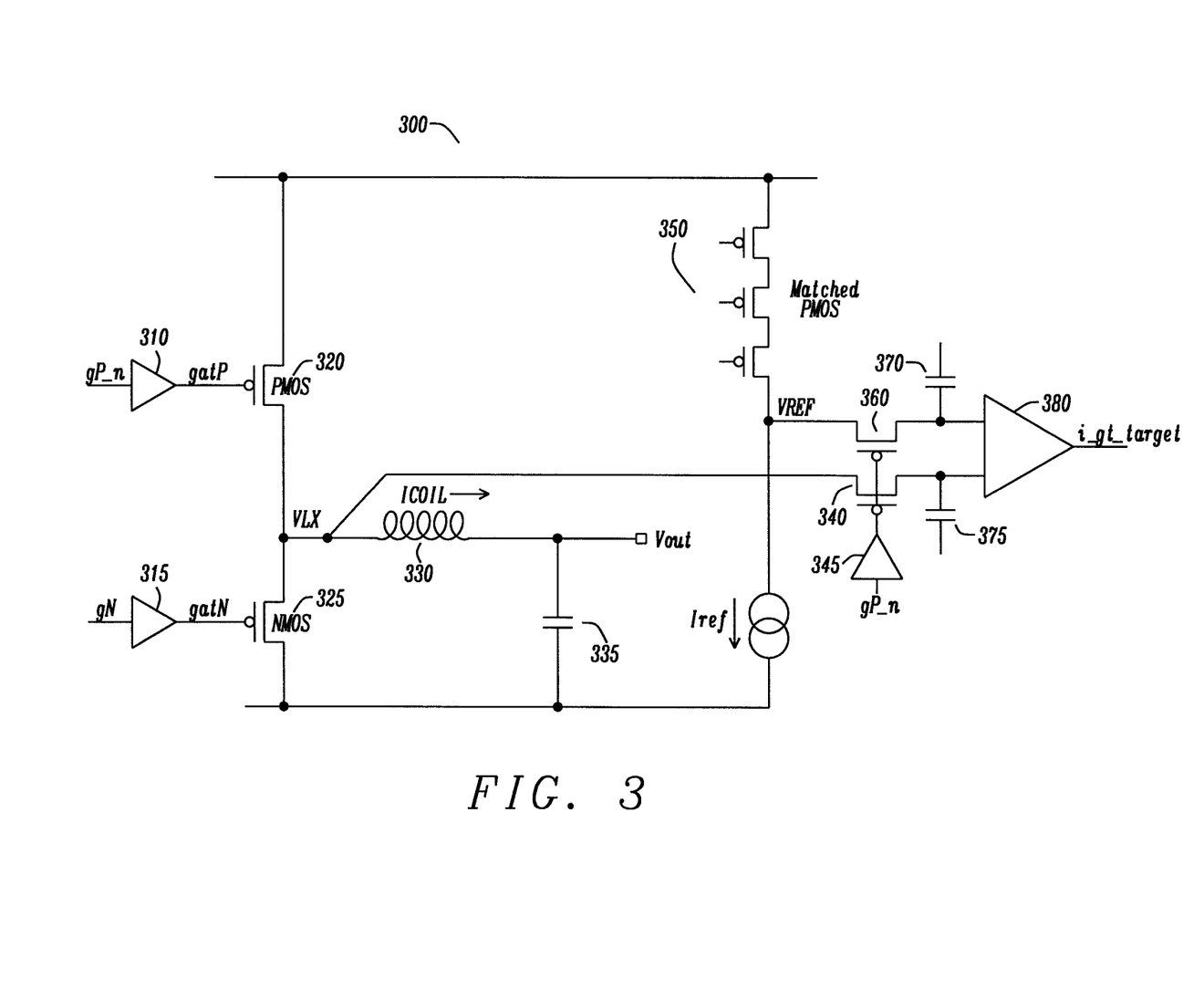
FIG. 3 shows a peak current servo, implemented with a sampling circuit used to compare the LX voltage with the reference voltage.

FIG. 3 shows peak current servo 300, implemented with a sampling circuit used to compare the LX voltage with the reference voltage, as disclosed in related patent application 102016217857.1. The voltage drop across the high-side pass-device is proportional to the coil current. Therefore the voltage on LX, with respect to the supply voltage, is a measurement of the coil current as well.

The circuit of FIG. 3 samples node voltage VLX, the voltage drop across high side pass-device 320. Reference voltage VREF is also sampled. Reference current IREF is drawn through matched PMOS 350, which matches part of the PMOS pass-devices. The reference current generates a voltage drop across the matched devices, which is compared to the voltage drop in high side pass-device 320, turned on with GATP low, and GP_N high, through inverter 310. Sampling switches 340 and 360 are turned on with the same control signal GP_N, through inverter 345. The voltage on VLX will ring and eventually settle. When high side pass-device 320 is turned off by GP_N going low, the sampling switches will also turn off. This will store the final values of VLX and VREF, on sampling capacitors 370 and 375, as inputs to comparator 380. The high side device is typically, but not limited to, a PMOS device. The output voltage, VOUT, is at the output of inductor 330, across capacitor 335.

Comparator 380 only samples the final values during low side device 325 on-time, and may be of the sense-amplifier type, to ensure high accuracy and low complexity. Low side device 325 is turned on with GATN high, as determined by GN low, through inverter 315. The comparator determines which voltage is larger, the final node voltage VLX at the end of the high side device on-time, or the reference voltage VREF. The output of the comparator sets signal I_GT_TARGET, when the peak coil current ICOIL is greater than the target current limit, as determined by an operational transconductance amplifier (OTA) programmed to a maximum value. The low side device is typically, but not limited to, an NMOS device.

There are alternatives to using a sense amplifier for the comparator. Any continuous comparator whose output is only sampled at the end of the on-time would be suitable. Alternative sampled comparators also are known in the art.

The voltages on the nodes VLX and VREF give a measure of the voltage drop across the high side devices 320 and 350. If the voltage drop across 320 is smaller than that across 350, then the current though the device 320 was smaller than that through 350, taking into account the scaling factors. Since the two devices 320 and 350 have the same supply voltage, then the nodes VLX and VREF can be directly compared to establish which device has the greater voltage drop. When the voltage drops are the same, then the current through 320 must be equal to the target current, again with scaling. The comparator tries to capture the cycle in which this is the case, where the current in 320 changes from being too low to too high, determining the value of the signal i_gt_target.

The fixed on-time can be increased or decreased, to bring the peak coil current achieved closer to the target value. The preferred embodiment is to use a counter that is updated each PFM cycle. Each time the high side device is turned off, the peak current achieved is sampled. The sample is compared to the target current, and the on-time and a counter is incremented or decremented. The value of the counter is then used to adjust the on-time used for subsequent cycles. In this way, the peak current achieved is adjusted slowly over several cycles, until it is very close to the target current, as it steps above and below the target current, for subsequent cycles.

Figure 4:
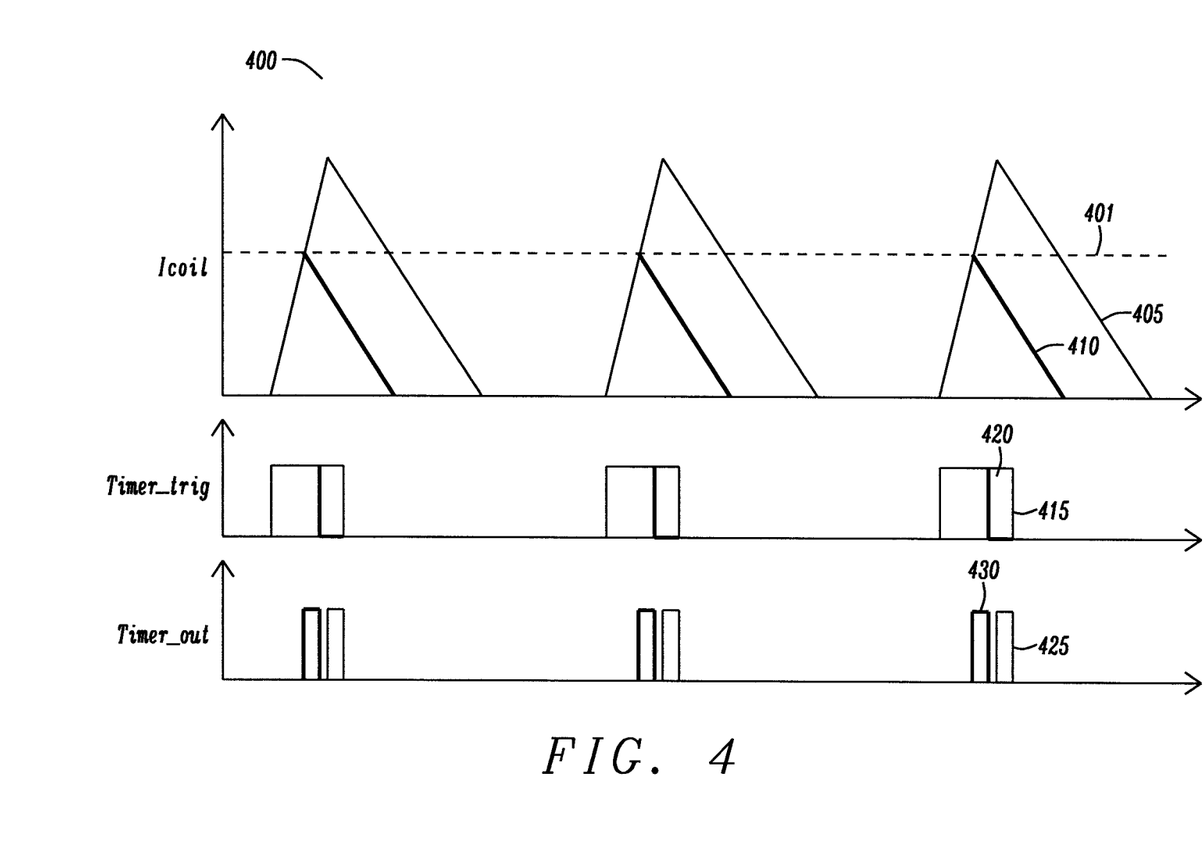
FIG. 4 is a timing diagram indicating how, by varying the on-time, the peak current of the DC-DC switching converter is controlled, embodying the principles of the disclosure.

FIG. 4 is timing diagram 400 indicating how, by varying the on-time, the peak current of the DC-DC switching converter is controlled, embodying the principles of the disclosure. The diagram shows two cases, 405 when the high side device on-time is longer and the peak current ICOIL exceeds target value 401, and 410 when the high side device on-time is shorter and the peak current ICOIL meets target value 401. When the output voltage drops under the target voltage, the high side device turns on. This will cause coil current ICOIL to ramp up. At the same time, an enable is raised on the timer cell. When TIMER_TRIG 415 is longer, and the on-time is longer, peak current ICOIL exceeds target value 401. TIMER_TRIG 420 is shorter when the on-time is shorter, and peak current ICOIL meets target value 401. The timer trigger being on causes the timer to start. At some fixed time later, the timer will raise a flag, indicating the fixed on-time has elapsed. TIMER_OUT 425 is raised when the on-time is longer and peak current ICOIL exceeds target value 401. TIMER_OUT 430 is raised when the on-time is shorter and peak current ICOIL meets target value 401.

The high side device is then turned off and the low side device is turned on. When the fixed on-time has elapsed, TIMER_OUT causes flag TIMER_TRIG to clear, and the timer trigger clearing causes the timer output to also clear. Once coil current ICOIL has ramped down to zero, the low side device is turned off and the output is set to tri-state. The output voltage then discharges with the load, until the output goes under-voltage and the cycle is started again. This scheme allows the peak current in PFM to be well controlled, regardless of the coil value or operating conditions, even for systems where the on-time is not sufficient for traditional peak current control.

Figure 5:
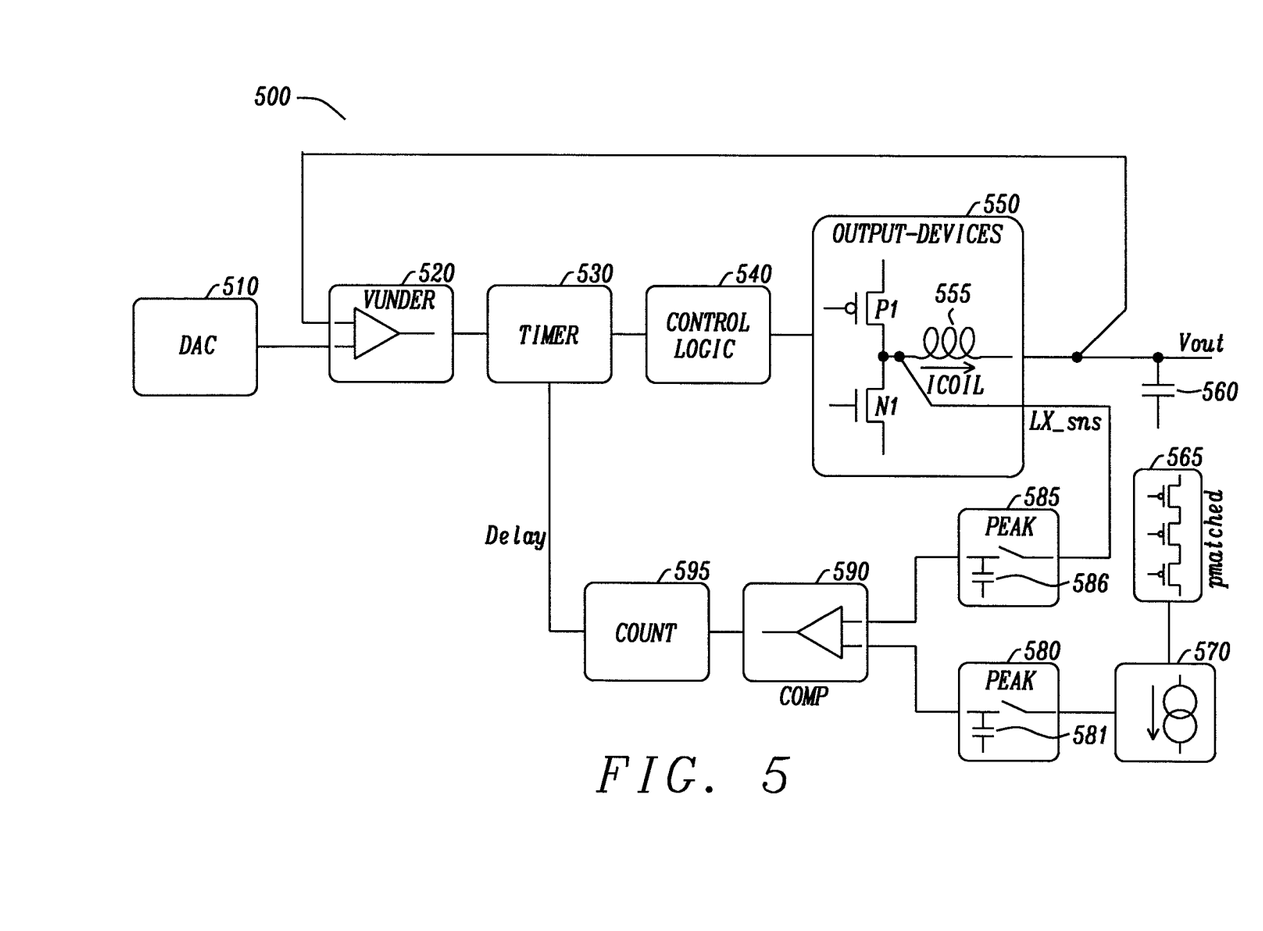
FIG. 5 illustrates a block diagram of a control loop for a constant on-time DC-DC switching converter, where a digital to analog converter (DAC) provides the target voltage for the switching converter, embodying the principles of the disclosure.

FIG. 5 illustrates block diagram 500 of a control loop for a constant on-time DC-DC switching converter, where a digital to analog converter (DAC) provides the target voltage for the switching converter, embodying the principles of the disclosure. The diagram shows the control loop, where the fixed on-time Buck switching converter architecture includes DAC 510 providing the target voltage, and ICOIL across inductor 555. The DAC voltage is compared with output voltage VOUT across capacitor 560, generating under-voltage signal VUNDER 520. This will trigger TIMER 530, turning on high side device P1 in OUTPUT-DEVICES 550. CONTROL LOGIC 540 waits for the timer to expire, and then turns off the high side device. LX voltage LX_SNS is sampled by PEAK 585 sampling block, on sampling capacitor 586. Reference current IREF 570 is sinked through the high side device matched with the pass-device in PMATCHED 565. This generates a voltage that can be sampled by PEAK 580 sampling block, on sampling capacitor 581. The two sampled voltages are compared with comparator COMP 590, and used to increment or decrement counter COUNT 595. The counter value then controls the length of TIMER 530.

A variant of the disclosure concerns making the total pulse width match the clock period used, once the switching converter moves to continuous conduction mode (CCM). It is typical to allow the switching converter to move to CCM operation to support high load currents. In this scheme, the switching converter is moved to synchronous mode, where it is clocked with a well-controlled frequency. The move from pulse-frequency modulation (PFM) can cause discontinuities in conditions, which can cause problems with the design of the system. In PFM mode, a peak current limit and a zero-cross comparator may control the ripple. In CCM, the ripple is a function of the coil, the supply voltage, the output voltage and the frequency. It may therefore be beneficial to match the ripple in PFM to that achieved in CCM, by matching the pulse duration in PFM to the clock period in CCM operation. This will smooth the transition between the low load region of operation and the high load region of operation.

In this case, the zero-cross comparator detects when the coil current is zero and turns off the low-side device. In FIG. 1, the action on the zero cross comparator is indicated in Icoil by the arrows. In PFM, the buck only switches when there is a requirement, as opposed to PWM where the buck switched continuously. In order to achieve this, the buck needs to stop switching when it is not required. Two actions are done to ensure that this happens. The high side device is only allowed to turn on when the output voltage is higher than the target voltage, and the buck is prevented from outputting negative currents. To prevent negative currents, it is detected when the coil current is zero, and the low side device is turned off to prevent the current falling further.

Figure 6A:
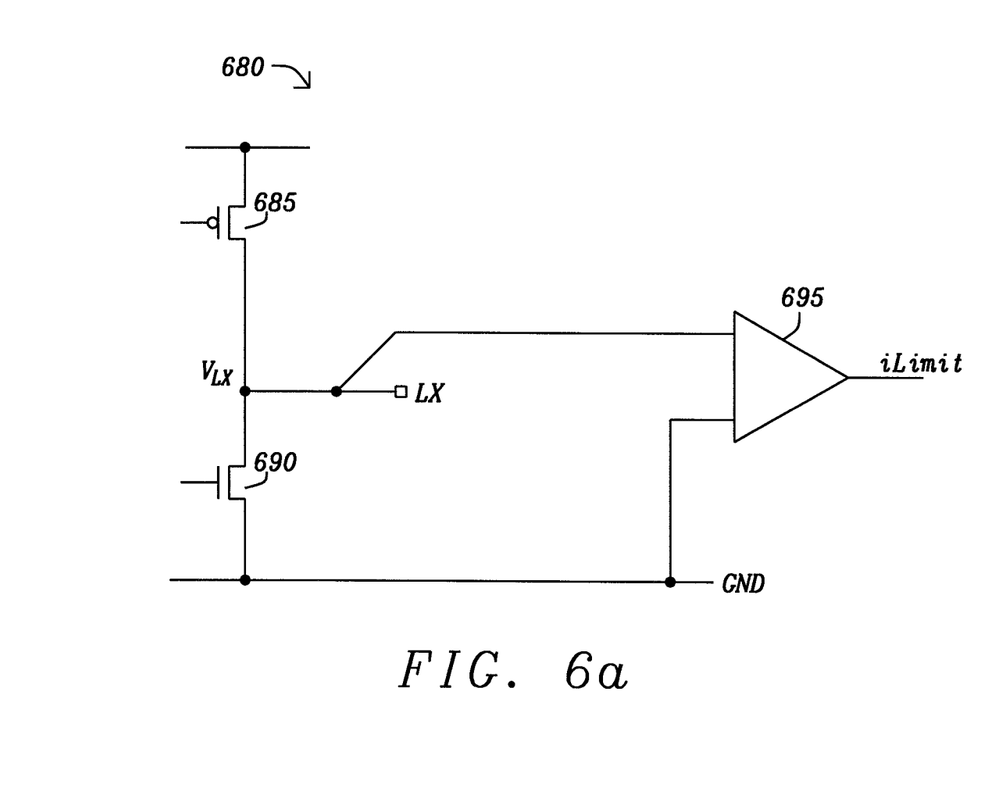
FIG. 6a shows a variant of the disclosure, where a zero-cross comparator is used to control the ripple.

FIG. 6a shows circuit 680, where in PFM mode, peak current limit iLimit and zero-cross comparator 695 control the ripple. The point where the voltage drop across low-side device 690 falls to zero is detected, indicating zero current in that device. In the same way as previously described for high side device 685, the LX voltage VLX can simply be compared with ground.

Matching the pulse duration in PFM, to the period in CCM operation, can be done in a similar way to the operation described in the main embodiment. The total pulse duration of the switching converter, including the high side device on-time plus the low side device on-time, can be measured. This can be compared to the clock period without phase information, and the fixed on-time can be varied to ensure subsequent total pulse durations are closer to the clock period.

One embodiment that could implement this scheme would be to use a pair of reference currents onto a pair of capacitors. When the high side device turns on, the first of these reference currents is switched onto a fully discharged capacitor. This will cause the voltage on the capacitor to increase linearly. On the next rising clock edge, the second reference current is switched onto the second discharged capacitor, and that capacitor starts to charge up with the same rate as the first. On the next rising clock edge, the current on the second capacitor is switched off, storing the final capacitor voltage on the second capacitor. When the low side device turns off, the current on the first capacitor is switched off, storing the final voltage on the first capacitor.

Figure 6B:
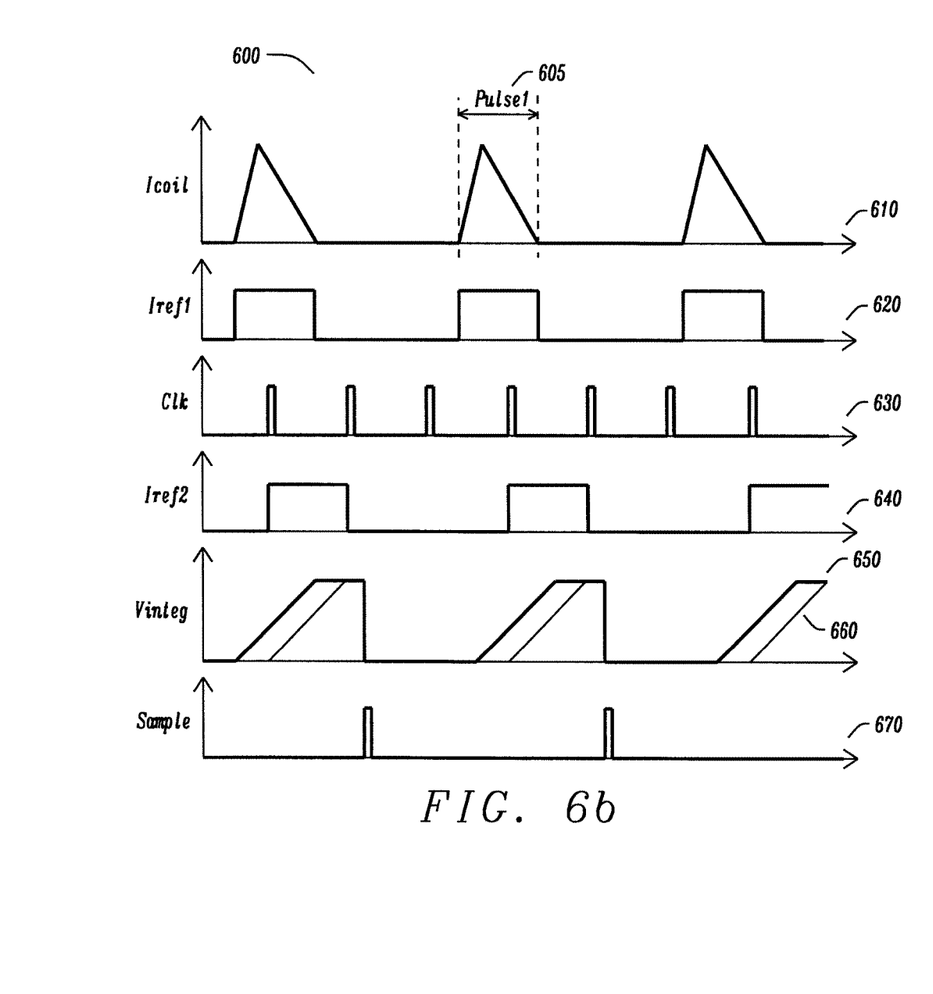
FIG. 6b illustrates signal waveforms, for controlling the pulse duration, for a constant on-time compared with the clock period, embodying a variant of the disclosure.

FIG. 6b illustrates signal waveforms, for controlling the pulse duration, for a constant on-time compared with the clock period, embodying a variant of the disclosure. The low side device is typically, but not limited to, an NMOS device, and the high side device is typically, but not limited to, a PMOS device. When the high side device turns on, coil current ICOIL 610 rises, and first reference current IREF1 620 is switched on. This charges up first capacitor voltage VINTEG 650. On the next rising edge of CLK 630, second reference current IREF2 640 is switched on. This charges up second capacitor voltage VINTEG 660. When the low side device turns off, the first current is switched off, and the second current is switched off after a single clock period. The two stored voltages, VINTEG 650 and VINTEG 660, are compared with SAMPLE 670 high.

Once both current sources IREF1 620 and IREF2 640 are switched off, the two stored voltages can be compared to give an indication of which duration, the clock period or PULSE1 605, is greater. The on-time can then be adjusted for the subsequent pulses to ensure the pulse duration is closer to the clock period. In the same way as the main embodiment, if a servo loop is made with a counter, over many cycles, the pulse duration will converge with the clock period. If this scheme is used, when the switching converter moves to CCM, the ripple will not change, smoothing the transition between the two regions of operation.

Figure 7:
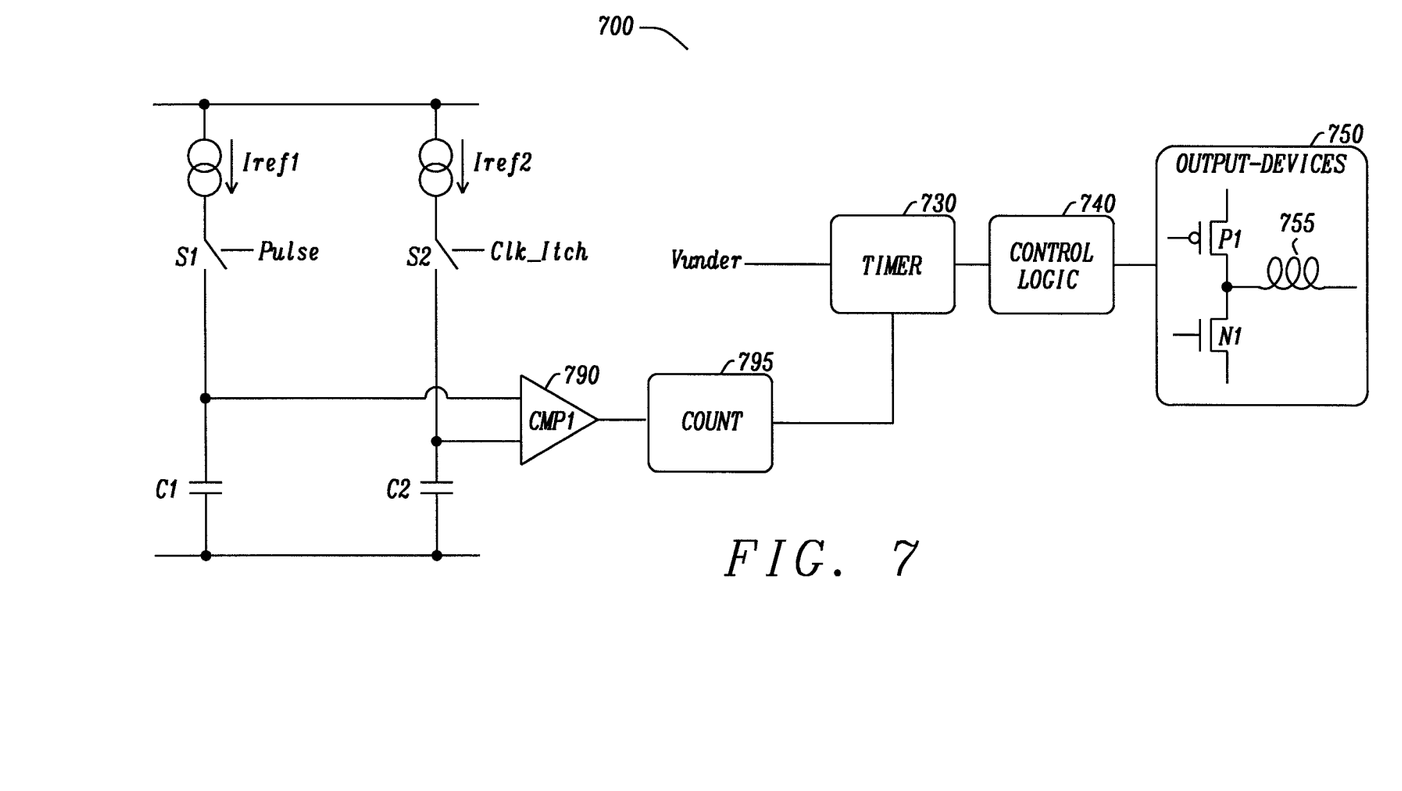
FIG. 7 shows a block diagram for controlling the pulse duration, for a constant on-time compared with the clock period, embodying a variant of the disclosure.

FIG. 7 shows a block diagram for controlling the pulse duration, for a constant on-time compared with the clock period, embodying a variant of the disclosure. When OUTPUT-DEVICES 705 P1 or N1 are turned on in PFM, switch S1 is turned on with PULSE, and reference current IREF1 is sourced to capacitor C1. On the next rising clock edge, switch S2 is turned on with CLK_LTCH, and reference current IREF2 is sourced to second capacitor C2. Then when the clock edge rises again, switch S2 is turned off, and final integrated voltage VINTEG 660 is stored on capacitor C2. When a single pulse is completed, switch S1 is turned off, and final integrated voltage VINTEG 650 is stored on capacitor C1. The voltages are then compared in CMP1 790, and the output of the comparator is used to increment or decrement counter COUNT 795. VUNDER, on when the output voltage falls below the target voltage in the switching converter, is an input to TIMER 730. The output value of the counter is also used to control the delay of TIMER 730, and the on-time of the high side device in LOGIC 740, in subsequent cycles. The coil current ICOIL can be observed across INDUCTOR 755.

Figure 8:
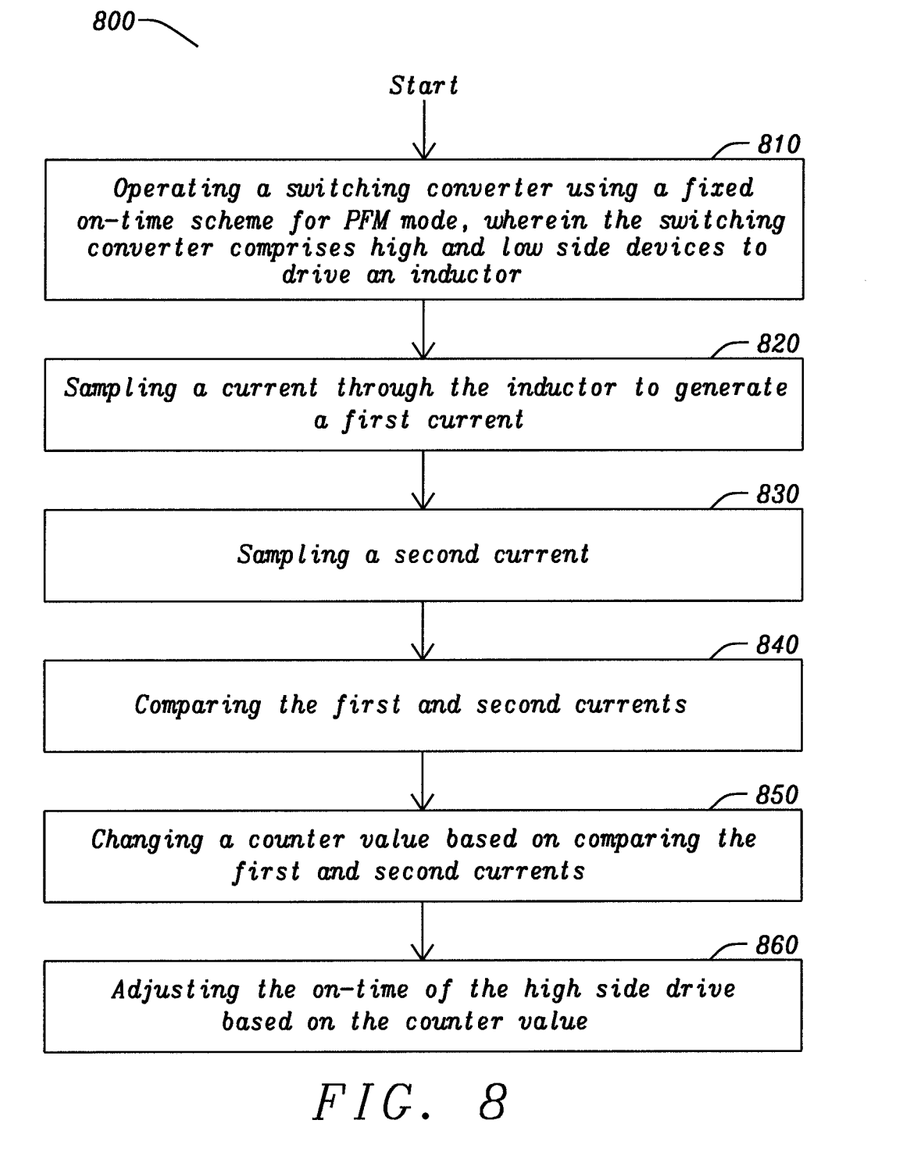
FIG. 8 is a flow chart of a method for pulse frequency modulation, for constant on-time in a peak-current servo, of a DC-DC switching power converter, embodying the principles of the disclosure.

FIG. 8 is flow chart 800 of a method for a DC-DC switching converter, supporting pulse-frequency modulation (PFM) mode and a constant on-time, embodying the principles of the disclosure. Operating a switching converter using a fixed on-time scheme for PFM mode, wherein the switching converter comprises high and low side devices, to drive an inductor, is provided in 810. Sampling a current through an inductor to generate a first current is provided in 820. Sampling a second current is provided in 830. Comparing the first and second currents is provided in 840. Changing a counter value, based on comparing the first and second currents, is provided in 850. Adjusting the on-time of the high side device, based on the counter value, is provided in 860.

The advantages of one or more embodiments of the present disclosure include allowing the height of the PFM pulses of a DC-DC Switching Converter (Buck, Boost, Buck-Boost, or similar switching converter) to be well controlled, regardless of variation in the coil value. The proposed implementation of the DC-DC Switching Converter removes the need for any lookup tables or means of measuring the supply voltage value. In addition, the scheme does not rely on measuring the high side device current, and can support smaller value inductor coils, resulting in shorter high side device on-times.

While this invention has been particularly shown and described with reference to the preferred embodiments thereof, it will be understood by those skilled in the art that various changes in form and details may be made without departing from the spirit and scope of the invention.

The invention claimed is:

1. A DC-DC switching power converter, comprising:
   a high-side and a low-side device, configured to be connected to a node of said DC-DC switching power converter;
   a sampling circuit configured to sample a first voltage at said node when said high side device is turned off, and a second voltage proportional to a reference voltage;
   a comparator to compare said first and said second voltages;
   a counter having an output configured to change based on an output of said comparator; and
   a timer configured to adjust an on-time of said high-side device based on said counter output;
   wherein said counter is configured in a loop, to adjust said on-time of said high side device, such that a peak current of subsequent cycles is configured to converge on said reference current.

2. The DC-DC switching power converter of claim 1, wherein said high-side and said low-side devices are configured to employ a pulse-frequency modulation (PFM) control signal and a controlled on-time.

3. The DC-DC switching power converter of claim 1, wherein said first voltage is proportional to a peak current, and said second voltage is proportional to a target current.

4. The DC-DC switching power converter of claim 3, wherein said comparator is configured to compare said first and second voltages just after said high side device turns off.

5. The DC-DC switching power converter of claim 1, wherein said sampling circuit is configured to sample said first voltage when said high side device is on, and to store said first voltage when said high side device is off.

6. The DC-DC switching power converter of claim 5, wherein said timer is configured to adjust said on-time of said high side device for a controlled on-time scheme for pulse-frequency modulation (PFM) mode.

7. The DC-DC switching power converter of claim 1, wherein said switching converter comprises a Buck switching converter.

8. The DC-DC switching power converter of claim 1, wherein said switching converter comprises a Boost switching converter.

9. The DC-DC switching power converter of claim 1, wherein said switching converter comprises a Buck-Boost switching converter.

10. The DC-DC switching power converter of claim 1, wherein said switching converter is configured with a small value inductor, to achieve an accurate peak current in pulse-frequency modulation (PFM).

11. A DC-DC switching power converter, comprising:
    a high-side and a low-side device, configured to be connected to a node of said DC-DC switching power converter;
    a first sampling circuit configured to sample a total pulse duration for an on-time of both said high-side and said low-side devices;
    a second sampling circuit to sample a clock period;
    a comparator to compare said total pulse duration and said clock period;

a counter having an output configured to change based on an output of said comparator; and a timer configured to adjust said total pulse duration based on said counter output.

12. The switching power converter of claim 11, wherein on a pulse when said high side device is configured to turn on said first switch is configured to turn on and said first reference current is configured to start sourcing to said first capacitor.

13. The switching power converter of claim 12, wherein after said low-side device turns off, said first switch is configured to turn off, and a first final integrated voltage is configured to store on said first capacitor.

14. The switching power converter of claim 11, wherein on a rising clock edge said second switch is configured to turn on and said second reference current is configured to source to said second capacitor.

15. The switching power converter of claim 11, wherein on a next rising clock edge said second switch is configured to turn off and a second final integrated voltage is configured to store on said second capacitor.

16. The switching power converter of claim 13, wherein said first final integrated voltage and second final integrated voltage are compared, and an output of said comparator is configured to increment or decrement said counter.

17. The switching power converter of claim 11, wherein an output of said counter is configured to delay said timer, and said timer is configured to control a total on-time of said high-side and low-side devices in subsequent cycles.

18. The DC-DC switching power converter of claim 11, further comprising a first current reference, a first switch, and a first capacitor, and a second current reference, a second switch, and a second capacitor.

19. The DC-DC switching power converter of claim 11, wherein said counter is configured to adjust said on-time of said high side device such that a total pulse duration of subsequent cycles is configured to converge on said clock period.

20. The DC-DC switching power converter of claim 11, wherein said on-time of said high side device is configured to match a clock period used in pulse-frequency modulation (PFM) to a clock period used in continuous conduction mode (CCM) operation.

21. A method for operating a DC-DC switching converter with a peak-current servo, having a pulse-frequency modulation (PFM) mode, comprising the steps of:

operating said switching converter using a controlled on-time scheme for said PFM mode, wherein said switching converter comprises high and low side devices, connected to a node of said DC-DC switching converter;

sampling a first voltage at said node when said high side device is turned off and a second voltage, proportional to a reference voltage;

comparing said first and second voltages;

changing a counter value based on said comparing of said first and second voltages; and adjusting the on-time of said high side device based on said counter value such that a peak current of subsequent cycles converges on a reference current.

22. The method of claim 21, wherein said first voltage is proportional to a peak current, and said second voltage is proportional to a target current.

23. The method of claim 22, wherein a timer is configured to adjust said on-time of said high side device based on said counter value.

24. The method of claim 21, wherein said first voltage and said second voltage are compared, just after said high side device turns off.

25. The method of claim 21, wherein a first voltage is sampled when said high side device is on, and said first voltage is stored when said high side device is off.

26. The method of claim 21, wherein said counter adjusts said on-time of said high side device for a controlled on-time scheme for continuous conduction mode (CCM) mode.

* * * * *